W. J. ROEPKE.
WHEEL STRUCTURE.
APPLICATION FILED DEC. 16, 1912.
1,192,348.
Patented July 25, 1916.
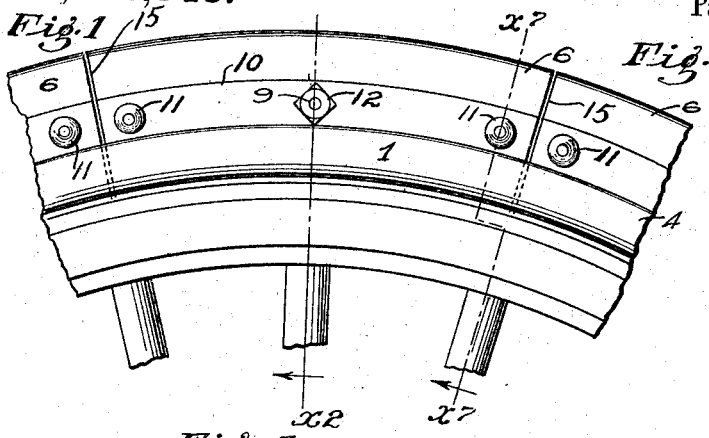
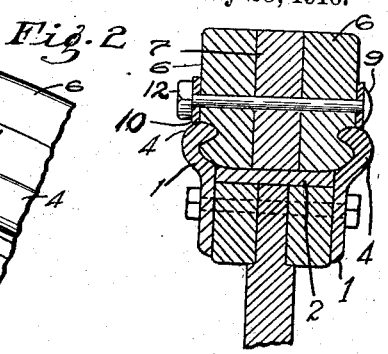
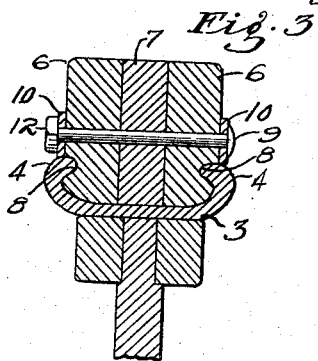
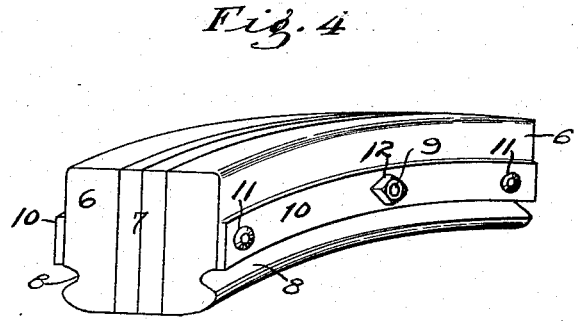
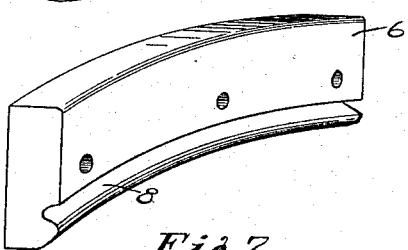
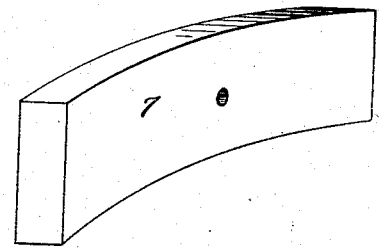
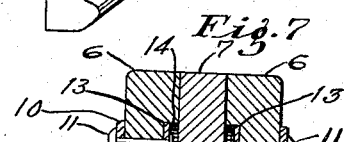
Witnesses:
Thor Sjoberg
L. Belle Rice
Inventor:—
William J. Roepke
by James R. Townsend
his Atty.

UNITED STATES PATENT OFFICE.

WILLIAM J. ROEPKE, OF LOS ANGELES, CALIFORNIA, ASSIGNOR TO CHARLES B. McCOY, OF LOS ANGELES, CALIFORNIA.

WHEEL STRUCTURE.

1,192,348.  Specification of Letters Patent.  Patented July 25, 1916.

Application filed December 16, 1912. Serial No. 737,122.

*To all whom it may concern:*

Be it known that I, WILLIAM J. ROEPKE, a citizen of the United States, residing at Los Angeles, in the county of Los Angeles and State of California, have invented a new and useful Wheel Structure, of which the following is a specification.

The object of this invention is to provide a wheel having a superior sectional tire of great strength and durability and the sections of which may be readily removed and replaced and which tire is adapted to fit any of the ordinary wheels having pneumatic tires, so that by carrying one or more sets of the tires the automobilist may not be seriously delayed in case of puncture of the pneumatic tire, but can replace such tire or tires quickly by the solid sectional tire and proceed on his journey until it is convenient to replace the pneumatic tire.

This invention may be constructed of various materials, and is capable of application with wooden blocks in such manner as to make a very durable and desirable tire.

The invention is applicable for tires of any kind of vehicles, but is more particularly designed for heavy machines such as motor trucks and the like.

The accompanying drawings illustrate the invention.

Figure 1 is a view of a segment of a wheel constructed in accordance with this invention. Fig. 2 is a cross-section indicated by line $x^2$, Fig. 1, showing the segmental block attached to a so-called solid rubber quick detachable rim. Fig. 3 is a cross-section of a wheel constructed with my newly invented segmental blocks attached to a so-called solid rim. Fig. 4 is a perspective view of one of the tire segments detached, there being shown two intermediate segmental block members. Fig. 5 is a view of an outside member detached. Fig. 6 is a view of an intermediate member detached. Fig. 7 is a cross-section on line indicated by $x^7$, Fig. 1 of a wheel constructed with a so-called pneumatic quick detachable rim. It will be seen from Figs. 2, 3 and 7 that the invention is interchangeably applicable for use with various kinds of rims.

The channeled rim of the wheel may be sectional as shown in one form at 1, 2, in Fig. 2, and in another form at 1″, 2″ and 3″ in Fig. 7; or integral as shown at 3 in Fig. 3, the channeled rim in all cases being of well known forms provided with oppositely arranged inwardly extending circular flanges 4.

The tire is composed of segmental blocks each comprising two outside segmental block members 6 of equal length, and one or more intermediate segmental key block members 7 of the same length as the members 6 and with its ends alined with the ends of the members 6. The outside faces of the outside block members are provided near their lower edges with segmental grooves 8 to receive the circular flanges 4. The inner faces of the outer block members are plane and both faces of each of the intermediate key block members are plane and parallel with each other, so that when the outer and intermediate block members that form a segmental block are placed together side by side, they constitute a built-up segment, the parts of which may be fastened together by a center through bolt 9, segmental straps 10 are fastened to the outer block members 6 by bolts or rivets 11 and are of the same length as the members 6, 7 and have their ends in alinement with the ends of said members; and the through bolt 9 also passes through said segmental straps; said bolt being secured by a nut 12 and holding the middle segmental member or members from slipping out. The segmental straps 10 rest against the periphery of the flange 4 and serve to reinforce and prevent splitting of the outer block members. They are supported by the rim so that when the weight of the truck comes onto a strap as may be the case where the wheel skids along a street car rail, the blocks 6 will be not split off. The rivets 11 are provided at the inner faces of the outer block members 6 with washers 13 seated in countersunk holes 14. The rivets 11 and bolt 9 thus constitute separate fastening means for the outer and intermediate block members respectively. In order to supply a wheel with a tire constructed of these segments, two outer segmental block members will first be placed in the rim of the wheel and the flanges 4 are entered into the grooves. Then the intermediate segmental key block member 7 is inserted between the outer segmental block members and driven home. The combined thickness of the two outer and the intermediate segmental block members is sufficient to fill transversely the channel in which they have been seated. When they are thus seated the bolts 9, if used, will be inserted through the bolt holes respectively and the nuts screwed home. This same operation will be repeated with other block members which are set apart to form inter-block spaced 15 one-sixteenth of an inch wide, more or less, to allow for swelling, until all the space in the rim around the entire wheel is practically filled and all the segments are in place and bolted. When the wheel is put to use, the spaces 15 become filled with dirt but that will squeeze out if the blocks swell.

When it is desired to remove the tire, this is readily done by reversing the operation above described, except that in cases of long usage where nuts are rusted on the bolts, it may be found necessary to chisel out intermediate segmental members, whereupon the outer segments can be forced together and together with the segmental straps 11 can be removed without taking out the bolts owing to the ends of the straps being alined with the ends of said segments.

It is understood that the segmental blocks may be of any suitable material, as rubber, wood fiber, pressed paper, or the like.

I claim:

1. A wheel for automobiles, trucks and the like comprising a rim having inwardly extending annular flanges, a tire comprising segmental blocks composed respectively of outer segmental block members grooved to receive the flanges, an intermediate block member seated between said outer block members and holding the outer block members engaged with the rim, segmental metal straps on the outside of said outer block members, said straps having their ends in alinement with the ends of said outer block members, and means free from the intermediate member to secure said straps and outer segmental block members together.

2. A wheel for automobiles, trucks and the like comprising a rim having inwardly extending annular flanges, a tire comprising segmental blocks composed respectively of outer segmental block members grooved to receive the flanges, an intermediate block member seated between said outer block members and holding the outer block members engaged with the rim, means securing the segmental block members together, segmental metal straps on the outside of said outer block members, and bolts securing said straps and outer segmental block members together independently of the intermediate block member.

3. A wheel for automobiles, trucks and the like comprising a rim having inwardly extending flanges; segmental block members seated between the flanges and having grooves in which the flanges fit; and segmental straps fastened to the blocks respectively and resting on the flanges.

4. A wheel for automobiles, trucks and the like comprising a rim having inwardly extending circular flanges; outer segmental block members grooved to fit the flanges and having countersunk holes in their inner faces; segmental straps at the outer edges of the grooves to rest on the rim; bolts or rivets having heads in said holes and securing the segmental straps on the outer blocks only; and intermediate key blocks between the outer blocks.

5. A wheel comprising a rim having flanges, a tire composed of outer segmental blocks and intermediate segmental blocks seated between said outer blocks to hold the outer blocks against the rim flanges, means to fasten said outer and intermediate segmental blocks together, straps bearing on the rim flanges and means to fasten the straps to said outer segmental blocks.

In testimony whereof, I have hereunto set my hand at Los Angeles, California, this 10th day of December, 1912.

WILLIAM J. ROEPKE.

In presence of—
JAMES R. TOWNSEND,
L. BELLE RICE.

Copies of this patent may be obtained for five cents each, by addressing the "Commissioner of Patents, Washington, D. C."